United States Patent [19]
Corcoran et al.

[11] 3,984,675
[45] Oct. 5, 1976

[54] WIDEBAND TUNABLE COHERENT SOURCE

[75] Inventors: Vincent J. Corcoran, Orange County, Fla.; Richard E. Cupp, Boulder County, Colo.; James J. Gallagher; William T. Smith, both of Orange County, Fla.

[73] Assignee: Martin Marietta Corporation, Orlando, Fla.

[22] Filed: Feb. 12, 1971

[21] Appl. No.: 114,795

[52] U.S. Cl. ............................ 250/199; 332/7.51; 307/88.3; 321/69 R; 350/161
[51] Int. Cl.² .................. H04B 9/00; H01S 3/00; G02F 1/39
[58] Field of Search .............. 250/199; 332/7.51; 307/88.3; 321/69 R; 350/161

[56] References Cited
UNITED STATES PATENTS

| 3,433,958 | 3/1969 | Lenzo | 250/199 |
|---|---|---|---|
| 3,610,932 | 10/1971 | Morse | 250/199 |
| 3,624,551 | 11/1971 | Gudmundsen | 250/199 |
| 3,639,774 | 2/1972 | Wolff | 307/88.3 |
| 3,639,775 | 2/1972 | Patel | 307/88.3 |
| 3,665,204 | 5/1972 | Nelson | 307/88.3 |
| 3,675,039 | 7/1972 | Boyd | 307/88.3 |
| 3,679,288 | 7/1972 | Harris | 250/199 |

*Primary Examiner*—John C. Martin
*Attorney, Agent, or Firm*—Julian C. Renfro; Gay Chin

[57] ABSTRACT

A tunable wideband coherent source comprising a laser source and a microwave source, means for combining and mixing the outputs of the laser and microwave sources so as to provide a combined output, and means for filtering the combined output so as to separate sum and difference components, with any undesired background being suppressed. Our source may be used with means for utilizing the sum signal, the difference signal, or both of these.

2 Claims, 4 Drawing Figures

INVENTORS
VINCENT J. CORCORAN
RICHARD E. CUPP
JAMES J. GALLAGHER
WILLIAM T. SMITH

BY *Julian C. Renfro*

ATTORNEY

WIDEBAND TUNABLE COHERENT SOURCE

BACKGROUND OF THE INVENTION

There has been a definite need for a source of highly coherent signals in the higher frequency regions, such as the infrared region and in the visible, so as to be available for wide bandwidth modulation, as a tunable local oscillatior, or as a spectroscopic source. Such a coherent source should be tunable over a wide bandwidth so that a large wavelength range can be searched.

Lasers, of course, are operative in the infrared and visible regions of the spectrum, but unfortunately, lasers have the characteristic of being tunable over only a narrow bandwidth. A klystron on the other hand is known to have a wide tuning range and a high degreee of coherence, but its upper frequency limit extends only to the submillimeter range.

When attempts are made to impress large information bandwidths directly on a laser carrier, problems arise because of the limited bandwidth capacity of the laser, and because wideband video modulation requires large driver power.

As will be discussed at length herein, we have provided a source of highly coherent signals in the higher frequency regions, so as to be available for a variety of purposes, and by the use of our novel techniques, large bandwidth capacities are available, being limited only by the microwave source that is used as the subcarrier for video information. The driver power requirement is reduced because of the fact that the modulation is impressed on such a subcarrier.

We accomplish the goal of providing the wideband tunable coherent source by combining a laser signal and a microwave signal in a nonlinear crystal to produce sum and difference frequency signals in the infrared or visible spectral regions, which signals are of course tunable over the frequency range of the microwave source. However, we encountered four major problem areas in achieving the goal. First, we had to find a material with the proper nonlinear coefficient, transmission, and orientation. Second, we had to arrange laser and microwave signals to enter such nonlinear material in aligned relationship, and phasematch the signals in the material to maximize the interaction in the material. Third, we had to separate the frequency that was generated from the laser signal that was used to generate the coherent, tunable wideband signal so that the tunable signal could be used without background interference from the laser signal, and fourth, we had to devise a sensitive detection scheme to verify the fact that the sum or difference frequency was being generated, and also so that the coherent tunable signal would be useful in system applications.

For an embodiment involving the use of a $CO_2$ laser and a millimeter wave klystron, a gallium arsenide crystal was used as the nonlinear material. This crystal had a reasonable nonlinear coefficient, is transparent to both the laser signal and the millimeter wave signal, and was chosen and utilized so as to have an orientation that would produce a nonlinear interaction.

The alignment of the $CO_2$ laser signal and the millimeter wave signal was accomplished by feeding the millimeter wave signal into a directional coupler and then into a waveguide where the gallium arsenide was located. The waveguide was designed so that phasematching between the laser signal and the millimeter wave signal could be achieved with the available crystal. The $CO_2$ laser was then pointed through the straight section of directional coupler into the gallium arsenide loaded wave guide. Because of the intensity of the $CO_2$ laser, it was possible to determine the location of the beam by burning a piece of paper before and after the loaded waveguide. The $CO_2$ laser position was then adjusted so that the radiation was coming through the center of the waveguide.

The separation of the tunable signal from the $CO_2$ laser signal was accomplished with a diffraction grating which separated the signals by virtue of the fact that it diffracted them at different angles. Approximately one meter away a small aperture was used to pass only the tunable signal.

The detection scheme we used to detect the tunable signal was a superheterodyne receiver, consisting of a mercury - cadmium - telluride infrared detector and a $CO_2$ laser local oscillator operating on a transition that was adjacent to the transition on which the $CO_2$ laser used for mixing was operated. In this way even very weak signals were able to be detected. A less sensitive receiver can be used if the signal level is increased, and in accordance with latter scheme, the klystron signal is chopped with a rotating wheel. A synchronous receiver with the same infrared detector and a Princeton Applied Research lock-in-amplifier can be used to envelope detect the signal, with the reference signal for the lock-in amplifier being derived from the chopping wheel.

SUMMARY OF THE INVENTION

In accordance with this invention, we thus have provided a novel technique involving a source operable in either the infrared or the visible, which source possesses the high coherence of a laser coupled with the tunability of a klystron or other appropriate microwave source. We achieved our purposes by operating a laser source in conjunction with a klystron or other microwave source, and then combining these in a crystal that from the optical sense is nonlinear. The irradiated crystal serves to generate sum and difference frequency signals that have combined properties of the microwave source and the laser source. Filter means are provided such that the sum and difference components can be separated, and then either or both of such components effectively used.

Our source can be used in conjunction with a variety of detector and receiver arrangements, and if weak signals are to be encountered, we may use a superheterodyne type arrangement in which a laser local oscillator is employed with a detector, with such laser functioning to improve receiver sensitivity.

It is therefore a primary object of this invention to provide a novel wideband source, capable of being easily tuned, and available for providing optical signals for use in a variety of applications such as spectroscopy, communications, optical radar, and tunable optical receivers.

It is another object of our invention to provide a tunable coherent signal in the infrared or optical region that can be used for a variety of purposes, including spectroscopic investigations of materials;

It is yet another object of our invention to provide a means for impressing wide bandwidth video information on an optical or infrared carrier.

It is yet still another object of our invention to provide a local oscillator that can be tuned over a wide frequency range and is consequently useful in a variety of applications, including the extraction of high frequency doppler information.

It is a more detailed object of this invention to provide on an optical carrrier, an extremely wideband modulation, accomplished by the indirect means of modulating a microwave source, such as a klystron, instead of the conventional method of imposing the modulation directly on the optical carrier. Prior approaches often required more power to produce modulation, or in some cases were incapable of producing wideband modulation, whereas in contrast, the techniques of modulating a microwave or millimeter wave source are well established.

These and other objects, features and advantages of this invention will be more apparent from a study of the appended drawings, in which.

DETAILED DESCRIPTION

Figure 1:
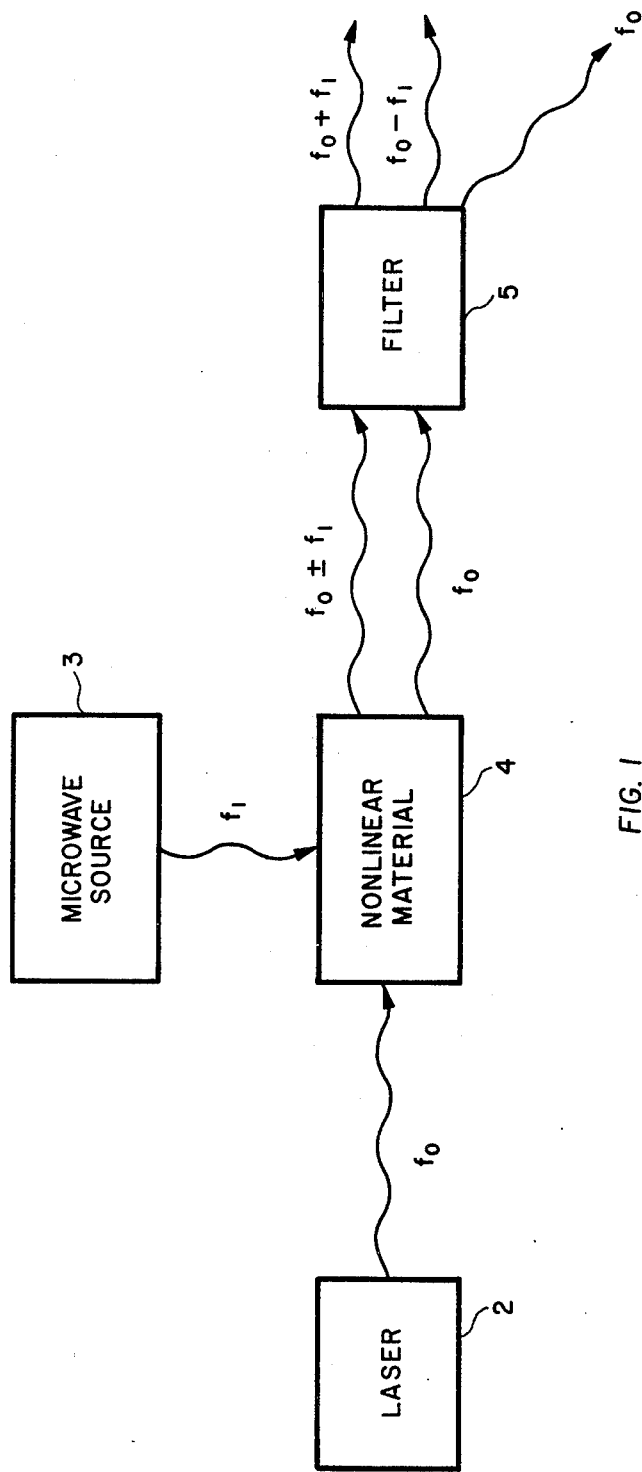
FIG. 1 is a simplified block diagram of an embodiment of our invention.

The basic technique for generating a coherent tunable wideband signal in the infrared or optical spectral region in accordance with our invention is illustrated at 1 in FIG. 1, wherein the significant components are shown by means of a block diagram. A laser source 2 and a microwave source 3 are directed into nonlinear material 4, and a sum or difference frequency is thereby generated. A filer 5 is used to suppress the laser signal and pass the sum or difference frequency signal, which is then propagated and used as a wideband tunable coherent signal.

Figure 2:
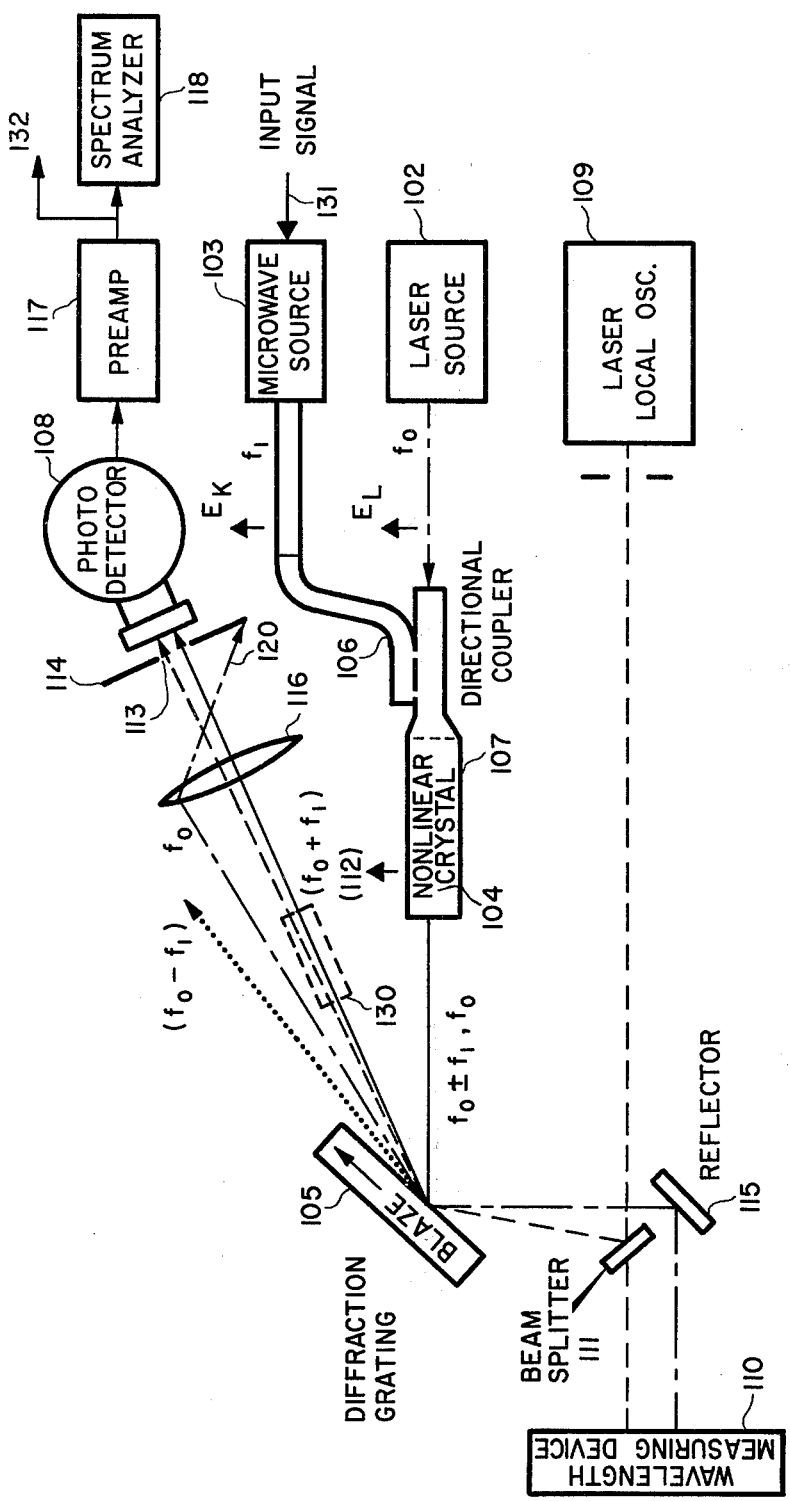
FIG. 2 is a more complete block diagram, showing a preferred embodiment, with a number of the vital components utilized in providing a source in accordance with this invention being set forth in approximately the proper operative relationship.

A specific arrangement by which we have provided a tunable wideband coherent source in the infrared range is disclosed in FIG. 2, involving a laser source 102, and a microwave source 103. The laser 102 is preferably a $CO_2$ laser, whereas the microwave source can be a klystron, preferably an OKI 55V11 reflex klystron. The outputs from sources 102 and 103 are combined in a directional coupler 106, which assures that the millimeter wave is in the $TE_{10}$ mode before entering the waveguide 107. The directional coupler may for example be an RG98/U device.

It should be noted from FIG. 2 that $E_k$ represents the polarization of the electric field of the signal from the klystron 103, whereas $E_L$ represents the polarization of the electric field of the signal from the laser 102. Therefore, the nonlinear crystal 104 to be used in accordance with this invention is placed in the waveguide 107 so that the orientation of the crystal is in the direction represented by the Miller indices [112] which is the same as the polarizations of the signals from the sources 102 and 103. The nonlinear crystal 104, which may be gallium arsenide, functions to generate sum and difference frequencies, as well as harmonics of the input signals thereto.

According to the preferred arrangement the signal from $CO_2$ laser 102 is monitored by a wavelength measuring device 110, such as an infrared spectrophotometer to determine the transition on which the laser is operating. A diffraction grating 105 is utilized to diffract the $CO_2$ laser radiation, and is also used to diffract the sum and difference frequencies generated in the nonlinear crystal 104 toward the receiver portion of this invention, in a manner to be discussed in detail hereinafter.

It is well known that in parametric interactions such as described here, phase matching increases the length over which the interaction occurs and consequently increases the signal generated. A number of phase matching techniques have been described in the literature, most of which achieve phase matching through use of the birefringent property of the nonlinear material. Another technique however can be used, in which phase matching is achieved by adjusting the microwave phase velocity by choice of the dielectric properties of the nonlinear material and the dimensions of the waveguide. Phase matching has been achieved in accordance with this latter technique herein by loading the waveguide with the gallium arsenide single crystal. This is a particularly effective technique utilizing gallium arsenide, because it is a cubic crystal and therefore has no birefringence. Also, because the material is cubic, the signal that is generated in the mixing experiment is colinear with the laser and microwave signal direction when they are aligned. In accordance with this invention, the phase velocity of the microwave signal was matched to the velocity of the laser signal by adjusting the sidewalls of the waveguide in which the gallium arsenide crystal was placed, in a manner to be described hereinafter.

It is important to note that by means of the present novel technique, it has been possible to enhance the sum and difference frequency signals without generating significant harmonic signals.

In accordance with this invention, we may use another laser, laser 109, to furnish a local oscillator component for the superheterodyne type receiver usable herein. In the preferred instance, we use a $CO_2$ laser for this purpose, but as in the case of laser 102, we are not to be so limited, for we could use a $N_2O$ laser in either or both locations, or replace the $CO_2$ lasers with CO lasers.

The output from the local oscillator 109 which is identified by the dashed lines in FIG. 2, is directed through a beam splitter 111 and onto the wavelength measuring device 110, which may be a spectrophotometer such as a Beckman IR-9. The device 110 of course enables the wavelength of the laser 109 to be monitored and the local oscillator output modified as may be necessary.

The beam splitter 111 is preferably of a material by Kodak known as IRTRAN 4, with the front surface of this device serving to direct another component of the output from laser 109 upon the diffraction grating 105. Latter device is adjustably mounted, for a reason to be developed hereinafter, with the grating 105 located and arranged such that for all its positions, the latter-mentioned component from the local oscillator 109 can be directed through aperture 113 of aperture plate 114, and thence upon the detector 108. However, it may well be necessary that voltage tuning of the laser cavity of the local oscillator 109 be utilized in order to change frequency in a selective manner.

The output from the nonlinear crystal 104 is therefore directed upon diffraction grating 105, which may be a Bausch & Lomb No. 35-53-06-890 plane reflectance grating. This grating principally serves to diffract the crystal output in such a manner that the tunable coherent signal generated in the nonlinear crystal 104, and the background signal from the laser 102, are effectively separated in space.

Regarding the output from the laser source 102 as being at frequency $f_0$, and the output from the microwave source 103 as being at frequency $f_1$, it will thus be seen that the output from the waveguide 107 may be regarded as being $f_0 \pm f_1$, inasmuch as the crystal 104 generates both sum and difference frequencies. Also included in this output is an $f_0$ component from the laser source 102, thus explaining the notation $f_0 \pm f_1, f_0$ at the waveguide output.

It is important to note that the diffraction grating 150 serves to separate the crystal output into a sum component, represented by a solid line bearing the designation $f_0 + f_1$, as well as a difference component, represented by a dotted line bearing the designation $f_0 - f_1$. The sum component is shown in the present instance being directed through the aperture 113 and onto the photodetector 108, although it is important to note that the position of the diffraction grating 105 can be selectively altered such that instead, the difference component is directed upon the detector 108, if such be desired.

With regard to the aforementioned $f_0$ component from the waveguide, it should be noted that the grating 105 serves to direct part of this component generally toward the plate 114, but not into the aperture 113, so this component is of course desirably not received by the detector 108. The other part of the component $f_0$ is directed in a completely different direction, with a reflector 115, such as a gold coated mirror, being disposed and arranged such that $f_0$ can be directed upon the wavelength measuring device 110. In this way, and as previously mentioned, the output of the laser 102 can be monitored.

A lens 116 may be utilized between the diffraction grating 105 and the aperture plate 114, as will be seen in FIG. 2. This lens serves to collect the energy that has been diffracted by the grating 105, thus assuring to a higher degree than otherwise, that desired components fall upon the detector 108. By the process of refraction upon which lens design is based, the components of radiation that enter at angles with respect to the optical axis of the lens 116 are bent, and as a result impinge upon the aperture plate 114 at a location other than at aperture 113. Note in FIG. 2 that ray 120 represents refraction by the lens 116 of the unwanted $f_0$ component. It is well known also that the lens 116, or for that matter any optical system that may be employed, may bring about an increase in the amount of energy collected by the receiver, thus increasing the signal level onto the detector 108, and facilitating observation of the desired tunable wideband coherent signal, representing either the sum or the difference. We may prefer to use an IRTRAN 2 lens having a 3 centimeter focal length.

The detector 108, which is an infrared detector when $CO_2$ lasers are used, serves to detect the tunable coherent radiation entering the aperture 113 from the grating 105, and produces an electrical output whose current is proportional to the input power. A superheterodyne scheme, involving the detector 108, laser local oscillator 109, and preamplifier 117, is definitely employed when signal levels are weak. When such a superheterodyne scheme is used, the previously referenced laser local oscillator signal also impinges upon the detector. The desired electrical output signal from the detector 108 in such instance is a current which is proportional to the product of the signal, and local oscillator radiant powers.

When the signal levels are sufficient, a superheterodyne type receiver arrangement is not needed, so that the laser local oscillator can then be dispensed with, and an envelope detection scheme employed. When latter such scheme is utilized, the output electrical signal current is proportional to the input average radiant power. A modulation can be impressed upon the klystron in this case, which modulation will then appear on the tunable coherent signal. As a result a narrow electrical bandwidth receiver can be employed in this case to detect the modulation even though the spectral bandwidth of radiation that can be detected is greatly increased over the superheterodyne receiver. Nevertheless the video receiver which employs envelope detection is not as sensitive as the superheterodyne receiver.

The detector utilized in conjunction with our novel wideband coherent source when using $CO_2$ lasers is preferably a mercury cadmium telluride detector of SAT-type 454106. The preamplifier 117 is of course used to amplify the low level electrical signal from the detector to a signal level sufficient for the spectrum analyzer 118 to receive and process. The spectrum analyzer is preferably a Hewlett-Packard, 8552A/8553L.

The output of the spectrum analyzer is an oscilloscope display, from which the amplitude and the frequency of the beat between the local oscillator and the desired signal can be determined. The spectrum analyzer is a convenient tool when a superheterodyne receiver is employed because the change in frequency of the beat as the frequency of the klystron is changed can be easily observed, thereby verifying that, in fact, mixing between the $CO_2$ laser 102 and the klystron 103 in the nonlinear crystal 104 has resulted in the generation of the desired tunable coherent signal. Of course, when a video receiver is used the spectrum analyzer is replaced by a more appropriate instrument, such as a lock-in amplifier.

A wide variety of receiving techniques could of course be employed. In fact, a receiver could be used in which the signal is first detected by means of the superheterodyne receiver described herein and then the signal out of the preamplifier could be switched to another receiver connected at output 132 so that the information could be processsed in a different manner, or in fact a number of techniques for processing the signal from the preamplifier 117 could be employed in parallel, i.e. simultaneously.

As an example of receiver technique, the superheterodyne receiver employed herein could be used to observe the fact that a signal is being returned from a moving target. Once detection has been achieved, the signal could be processed by a receiver which accurately measures the frequency of the return signal and uses a feedback loop to then track the incoming signal so that the receiver could lock thereon.

With regard to the microwave source 103, it is to be understood that in the event a klystron is used, it may receive various forms of input signals. For example, a control signal 131 may be inserted into the klystron for causing the frequency of the output signal from the klystron to be changed in a selected, controlled manner. Alternatively, a modulator may be employed in conjunction with the klystron for causing modulation information to be impressed upon the klystron, thus resulting in a variation in the output of the tunable coherent source.

As previously indicated, one major purpose served by the device shown in FIG. 2 is the provision of an output from the preamplifier but, in addition, it is to be noted that a component 130 may be placed between the diffraction grating 105 and the photodetector 108. This component 130 could be a gas cell, a crystal solid, or a semiconductor. In this way it is possible to study the effects of the interaction of the tunable coherent electromagnetic radiation that has been generated, with the materials that have been accumulated, thereby allowing the possibility of gaining insight into the physical phenomena associated with the interaction It should be noted that by the use of a component 130 in approximately the position shown, the detector 108 is enabled to sense the amount of absorption by the component 130 of the tunable coherent signal, such as $f_0 + f_1$.

Figure 3:
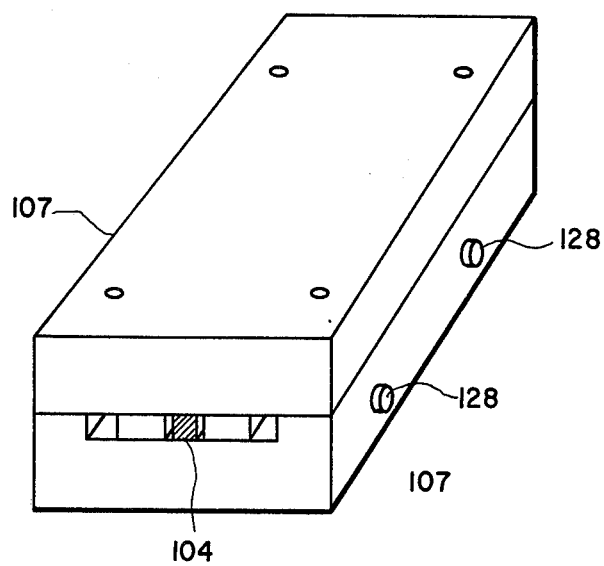
FIG. 3 is a perspective view of a typical waveguide arrangement of the type in which a nonlinear crystal may be contained.
Figure 4:
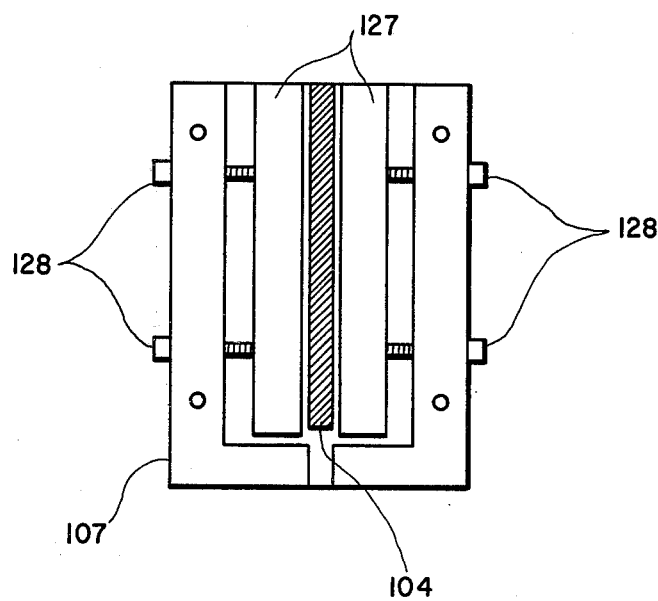
FIG. 4 is a view of the waveguide with its lower portion turned approximately 180° from the position shown in FIG. 3, and with its upper portion removed to reveal the nonlinear crystal and the movable inner walls. filter

Referring now to FIGS. 3 and 4, we have there shown an exemplary version of a gallium arsenide loaded waveguide, such as may be utilized herein. The waveguide 107 may be seen to be in two parts to simplify the placement of the gallium arsenide crystal 104 therein. The waveguide is preferably of brass, whose inner surfaces have been coated with gold to increase the conductivity of the walls.

Inner walls 127 of the waveguide are essentially parallel to the gallium arsenide crystal 104, and are spaced slightly therefrom so that an air gap exists. These inner walls are adjustably and selectively movable, being mounted on screws 128, so that the air gap can be changed. As is well known, the cutoff frequency of the waveguide and the phase velocity of the microwave signal to the waveguide are determined by the width of the loading material, in this case gallium arsenide, and the size of the air gap. Therefore, by suitable manipulation of the screws, the operator can accomplish phase matching of the desired interaction in the nonlinear material. Other nonlinear materials may be indium antimonide, indium arsenide, zinc selenide, and other such cubic materials.

The gallium arsenide crystal 104, an end of which is shown in FIG. 3, and the upper portion of which is shown in FIG. 4, may be a Monsanto crystal 0.27 × 0.27 × 5 centimeters in size, which is chromium compensated to have a resistivity greater than $10^7$ ohm-centimeters. The crystal is cut so that the [112] plane is parallel with the top and bottom of the waveguide, as seen in FIG. 3, and the [111] plane perpendicular to the top and bottom. The polarization of the millimeter wave signal and the $CO_2$ laser signal used in mixing is in the same direction as the [112] direction of the crystal. The waveguide used in the exemplary embodiment shown in FIGS. 3 and 4 may be 1½ inches wide as shown in FIG. 3, and ⅞ inch high, and 2⅜ inches long in the dimension corresponding to the length of the crystal in FIG. 4.

The coherence length for the nonlinear interaction by proper adjustment of the waveguide sides was calculated to be longer than the physical length of the crystal. The cut-off frequency of the loaded waveguide was well below the millimeter wave frequencies used. A waveguide such as 107 is used in order that phase matching of the laser and microwave sources can be accomplished, but it is to be noted that phase matching can be achieved by techniques other than using a loaded waveguide. For example, with a noncubic material such as tellurium, the birefringence of the material might be used to achieve phase matching without using the waveguide technique.

The $CO_2$ lasers used can be water cooled flowing gas systems that are excited by a current regulated power supply. Passive stabilization of the laser is achieved by using Cer-Vit spacers in the cavity. One mirror of the cavity is mounted on a piezoelectric ceramic so that the laser frequency can be voltage tuned. The single frequency output is typically a few watts in the dominant mode. Measurement of the output characteristics of the lasers indicated that they operated in the dominant transverse mode at a single frequency and that no off axis modes were present. It is evident that lasers other than continuous wave devices could be used in these experiments and that, in fact, larger signals could be generated by using pulsed or Q-switched lasers because the magnitude of the interaction is proportional to the product of the peak powers of the input signals. Also, if the tunable coherent wideband signal were desired in another region of the optical or infrared spectrum, it is clearly evident that other lasers could be used in combination with different nonlinear materials.

The millimeter wave klystron we used in some reduction to practice efforts was an OKI 55V11 with a power output of approximately 135 milliwatts, as previously mentioned. Klystrons operating at different frequencies could of course be used depending upon the desired frequency of the tunable coherent wideband signal. It is also evident that other coherent wideband microwave devices such as the carcinotron could be used in lieu of the klystron.

The directional coupler used in these experiments has a coupling loss of 3 db so that approximately 67 milliwatts reaches the gallium arsenide crystal. The Bausch and Lomb diffraction grating 105 used is blazed at 34.8° for 8 micron radiation. Other techniques of filtering could be employed such as a technique in which a prism replaces the diffraction grating and spreads the laser signal and tunable signal generated in space. Also, it is possible by proper orientation of a crystal to cause the generated signal and the laser signal to be emitted from the nonlinear material at different angles. It is also evident that other detectors could be used and in fact would be used if the frequency of the laser were to change.

Envelope detection can be accomplished by chopping the signal from the millimeter wave klystron and using a synchronous detector which derives its reference signal from the chopping wheel. The synchronous detector consists of the same mercury cadmium telluride detector followed by a Princeton Applied Research lock-in amplifier. The output can be observed on the amplifier panel meter or can be sent to an XY recorder.

As should now be apparent, we have provided in accordance with this invention, a tunable wideband coherent source comprising a laser source and a microwave source, and means for combining and mixing the outputs of the laser and microwave sources so as to provide a superimposed output. Means for filtering this combined output are provided so that only a desired signal will be passed, with any undesired background thus being eliminated, and the desired signal then being delivered to a point of use.

It is often that we use a detection means for detecting the desired signal, with a local oscillator being employable in conjunction with latter means, if such be necessary to improve receiver sensitivity. Within the purview of our invention is the use of a control signal, employed in conjunction with the microwave source, so that the frequency of signal from latter source can be changed in a controlled manner. Also usable with the microwave source is a modulator, so that modulation information can be impressed on the microwave source and thereby on the tunable coherent source, so that such information can be transmitted to a receiver.

It is also to be noted that a component such as a gas cell, a crystal solid, or a semiconductor can be disposed between the means for filtering and the output of the source, thus to enable the study of the effects of the interaction of tunable coherent electromagnetic radiation with such a component.

Although we have called source 103 a microwave source, it is to be understood that we can there use a source functioning in the higher frequency millimeter wave and submillimeter wave ranges. The carcinotron mentioned above is of course well known as a source of radiation in latter ranges.

Our invention may be used as a velocity meter by virtue of the fact that as the frequency of an incoming signal from a laser tends to change due to motion of the vehicle on which the laser is mounted, the output frequency of the klystron can be made to change, so that the tunable coherent signal generated by mixing the klystron and laser signals in the nonlinear material will correspondingly change in frequency, thus making our device able to track changes in frequency of the incoming signal.

We claim:

1. A variable frequency coherent source comprising a first source and a second source, said first source being a laser source, and said second source being an electromagnetic wave source tunable over selected ranges of the microwave portion of the electromagnetic spectrum, means for combining and for mixing the outputs of said first and second sources over substantially the entire tuning range of said second source, so as to provide a combined output, such combined output comprising the laser source frequency, the electromagnetic wave source frequency, and sum and differences of such two frequencies, and means for filtering the combined output before transmission thereof, so that at least one of such sum and difference frequencies will be passed as a desired signal, with any undesired background thus being eliminated, such desired signal then being delivered to a point of use, said means for combining and mixing being a nonlinear crystal.

2. The source of claim 1 wherein said nonlinear crystal is disposed in a waveguide usable for phase matching said laser and microwave sources.

* * * * *